United States Patent [19]

Borchard

[11] 4,234,394
[45] Nov. 18, 1980

[54] METHOD FOR PRODUCING AN INFORMATION CARRIER DISC

[75] Inventor: Heinz Borchard, Nortorf, Fed. Rep. of Germany

[73] Assignee: Teldec Telefunken-Decca Schallplatten GmbH, Hamburg, Fed. Rep. of Germany

[21] Appl. No.: 39,573

[22] Filed: May 16, 1979

[30] Foreign Application Priority Data

May 16, 1978 [DE] Fed. Rep. of Germany ....... 2821297

[51] Int. Cl.³ .............................................. C25D 1/10
[52] U.S. Cl. ...................................................... 204/5
[58] Field of Search ................................... 204/5, 281

[56] References Cited

U.S. PATENT DOCUMENTS

| | | | |
|---|---|---|---|
| 2,905,614 | 9/1959 | Porrata | 204/5 |
| 3,431,333 | 3/1969 | Fiornascente | 204/5 |
| 3,801,476 | 4/1974 | Roschmann | 204/5 |
| 3,956,075 | 5/1976 | Rohwer | 204/5 |

*Primary Examiner*—T. M. Tufariello
*Attorney, Agent, or Firm*—Spencer & Kaye

[57] ABSTRACT

A method for producing a record copy disc by cutting a spiral groove into an original provided with a centering formation centered relative to the spiral groove, electrochemically transferring the groove pattern from the original to a master and forming the copy disc from the master, the step of transferring is performed so as to reproduce the centering formation electrochemically on the master, and the step of forming the copy disc is performed so as to form a centering formation on the copy disc from the reproduced centering formation on the master.

11 Claims, 5 Drawing Figures

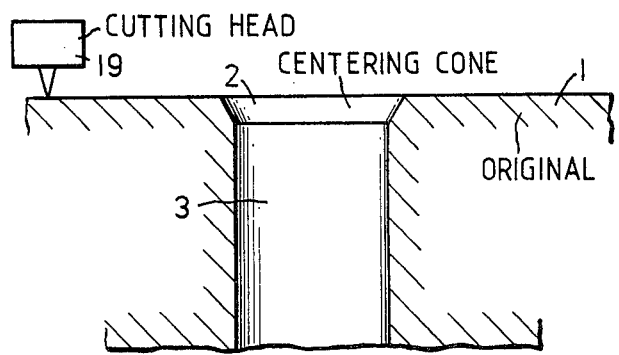
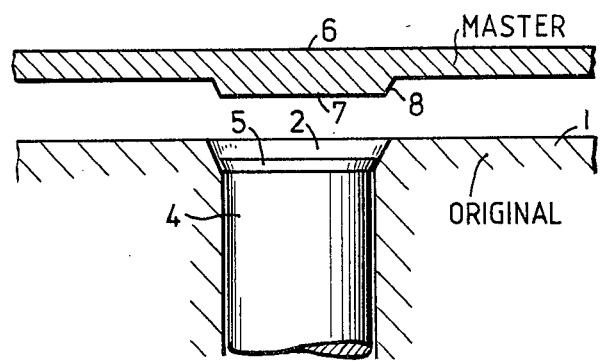
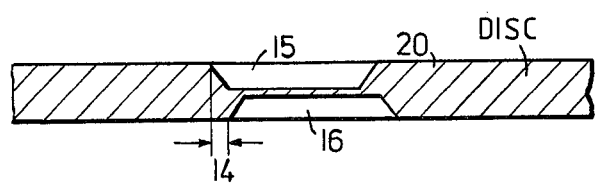
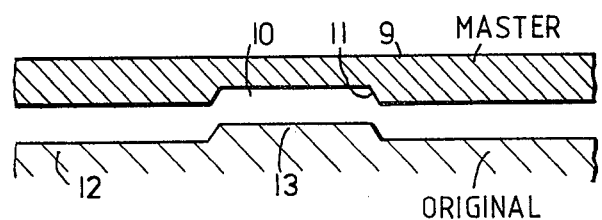
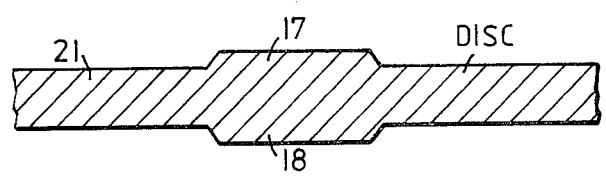

METHOD FOR PRODUCING AN INFORMATION CARRIER DISC

BACKGROUND OF THE INVENTION

The present invention relates to a method for producing a record copy disc, particularly a disc having a high groove density.

Disc recordings are usually produced by cutting a spiral-shaped groove modulated with the information into a rotating body called an original. The material into which the groove is cut may be a lacquer, as is often used in the manufacture of phonograph records, or a soft, very homogeneous metal, e.g. copper. From the pattern cut into the original a reproduction called a master is made by electrochemical means. This master is a negative of the disc copies to be produced.

After production of the master, the center of the spiral groove transferred to the master is first determined and marked by measuring, with the aid of optical enlargers, the distance of one groove ring from various points on the periphery. The disc is adjusted so that this distance is the same everywhere. Special optical devices are available for this purpose. When this method is used, a maximum eccentricity of, for example, 0.2 mm can be maintained, which is sufficient for conventional phonograph records.

However, for rigid discs employed to provide high storage, or groove, densities the eccentricity of the center of the groove being played back must not exceed, for example, 0.02 mm.

SUMMARY OF THE INVENTION

It is an object of the present invention to produce such information carrier discs while permitting high tolerance demands to be met in as simple a way as possible.

These and other objects are achieved, according to the invention, in a method for producing a record copy disc by cutting a spiral groove into an original provided with centering means centered relative to the spiral groove, electrochemically transferring the groove pattern from the original to a master and forming the copy disc from the master, by carrying out the step of transferring in a manner to reproduce the centering means electrochemically on the master, and carrying out the step of forming the copy disc by forming centering means on the copy disc from the reproduced centering means on the master.

In the method according to the invention the centering means which can be accurately applied on the original is electrochemically transferred from the original to the master. This centering is very accurate with respect to the groove formed on the original.

When discs are produced which are to be played on both sides, two masters are made in the above-described manner. In order for the accuracy of the transferred centering means to become fully effective, each side of the disc is given its own centering means. This centering means may be designed, for example, as a conical recess or as an outwardly oriented centering pin on the disc.

BRIEF DESCRIPTION OF THE DRAWING

FIG. 1 is a simplified cross-sectional view of a record original.

FIGS. 2a and 2b are simplified cross-sectional views illustrating steps for transferring the centering means from the original to the finished disc according to one embodiment of the invention in which the centering means in the original is in the form of a bore or recess.

FIGS. 3a and 3b are views corresponding to those of FIG. 2 showing an embodiment in which the centering means in the original is in the form of a centering pin protruding from the disc.

DESCRIPTION OF THE PREFERRED EMBODIMENTS

FIG. 1 shows, in cross section, an original 1 having a central bore 3. The bore 3 is widened into a centering zone portion 2 at that surface of the original 1 into which the spiral-shaped groove is being cut. The spiral-shaped groove is cut by means of a cutting stylus attached to a cutting head 19. The material into which the groove is cut is assumed to be, for example, a thin, homogeneous copper layer on the surface of the original 1.

FIG. 2a depicts how the centering means in the original is transferred electrochemically from the original 1 to a master 6 during production of the latter. After the cutting of original 1, a rivet-type plug 4 having a conical head 5 is inserted into the bore 3 in the original 1. The head 5 of plug 4 fills only part of the centering cone 2. After the application of a release medium, master 6 is made in a known manner from the cut surface of the original 1, this master constituting a negative of the surface of the original 1. The recess in the surface of the original 1 made by the centering cone 2 is reproduced on the master 6 as a protruding pin 7 having a conical outline 8. Master 6 is employed, directly or through intermediate duplication steps, to produce final record copies.

In order to produce a record copy disc which can be played on both sides, two different masters are required. The conical pins on the two masters are reproduced, as shown in FIG. 2a, as respective conical recesses 15 and 16 in the center of record copy disc 20. The centering means thus obtained are very accurate with respect to the groove disposed on the same side of the disc. It is possible, for example, to maintain a maximum permissible eccentricity of 0.02 mm for the groove spiral with respect to he centering means on the same side of the disc. The eccentricity between the two sides of the disc, which is shown at 14 for disc 20 in FIG. 2b, might be much greater and could reach, for example, 0.2 mm. Therefore, during playback of the disc that centering means 15 or 16, respectively, associated with the groove to be played back is used to center the disc on the playback instrument so that the deviation 14 will have no annoying effect.

FIG. 3a shows the method according to the invention in which the original 12 is provided with centering means in the form of a conical pin 13. During the cutting process, the original is centered from the top at this pin 13 by means of a centering bell which is not shown. The centering means 13 are reproduced on master 9 as a recess 10 having a conical outline 11. This recess, or the corresponding recess on the reproduced intermediate carriers, respectively, results in formation of the conical centering pin 17 or 18, respectively, in the record copy disc 21.

It will be understood that the above description of the present invention is susceptible to various modifications, changes and adaptations, and the same are intended to be comprehended within the meaning and range of equivalents of the appended claims.

What is claimed is:

1. In a method for producing a record copy disc by cutting a spiral groove into an original provided with centering means centered relative to the spiral groove, electrochemically transferring the groove pattern from the original to a master and forming the copy disc from the master, the improvement wherein said step of transferring comprises reproducing the centering means electrochemically on the master, and said step of forming the copy disc comprises forming centering means on the copy disc from the reproduced centering means on the master.

2. Method as defined in claim 1 wherein the copy disc and the centering means thereon are formed directly from the master.

3. Method as defined in claim 1 wherein the copy disc and the centering means thereon are formed from an intermediate carrier itself formed from the master to include a reproduction of the centering means carried by the master.

4. Method as defined in claim 2 or 3 wherein the original is provided with a centering bore a portion of which constitutes, said means of said original said centering centering bore is reproduced on the master in the form of a projection, and the centering means on the copy disc has the form of a recess corresponding to the projection.

5. Method as defined in claim 4 wherein the copy disc carries a recording in the form of a spiral groove on each side and is provided with said centering means in the form of a recess at at least one side, with the depth of said recess being no greater than one-half the thickness of the copy disc.

6. Method as defined in claim 4 wherein said step of transferring comprises inserting a plug into the centering bore in the original for closing the centering bore in order to form, on the master, a reproduction of only the portion of said centering bore which constitutes said centering means of said original.

7. Method as defined in claim 2 or 3 wherein the centering means of the original has the form of a projection and is reproduced on the master in the form of a corresponding recess.

8. Method as defined in claim 2 or 3 wherein said centering means of the original, master and copy each has a frustoconical form.

9. In a method for producing a record copy disc by cutting respective spiral grooves into two originals each provided with centering means centered with respect to the associated spiral groove, electrochemically transferring the groove pattern and centering means from each original to a respective master, and forming the copy disc from both masters by transferring the groove pattern from each master to a respective side of the copy disc, the improvement wherein said step of forming the copy disc comprises forming respective centering means at each side of the copy disc from the centering means on the respective master from which the groove pattern is transferred to the same side of the copy disc.

10. Method as defined in claim 9 wherein the centering means at each side of the copy disc is a recess having a depth no greater than one-half the thickness of the copy disc.

11. Method as defined in claim 9 wherein the centering means at each side of the copy disc is in the form of a projection.

* * * * *